Patented Jan. 8, 1929.

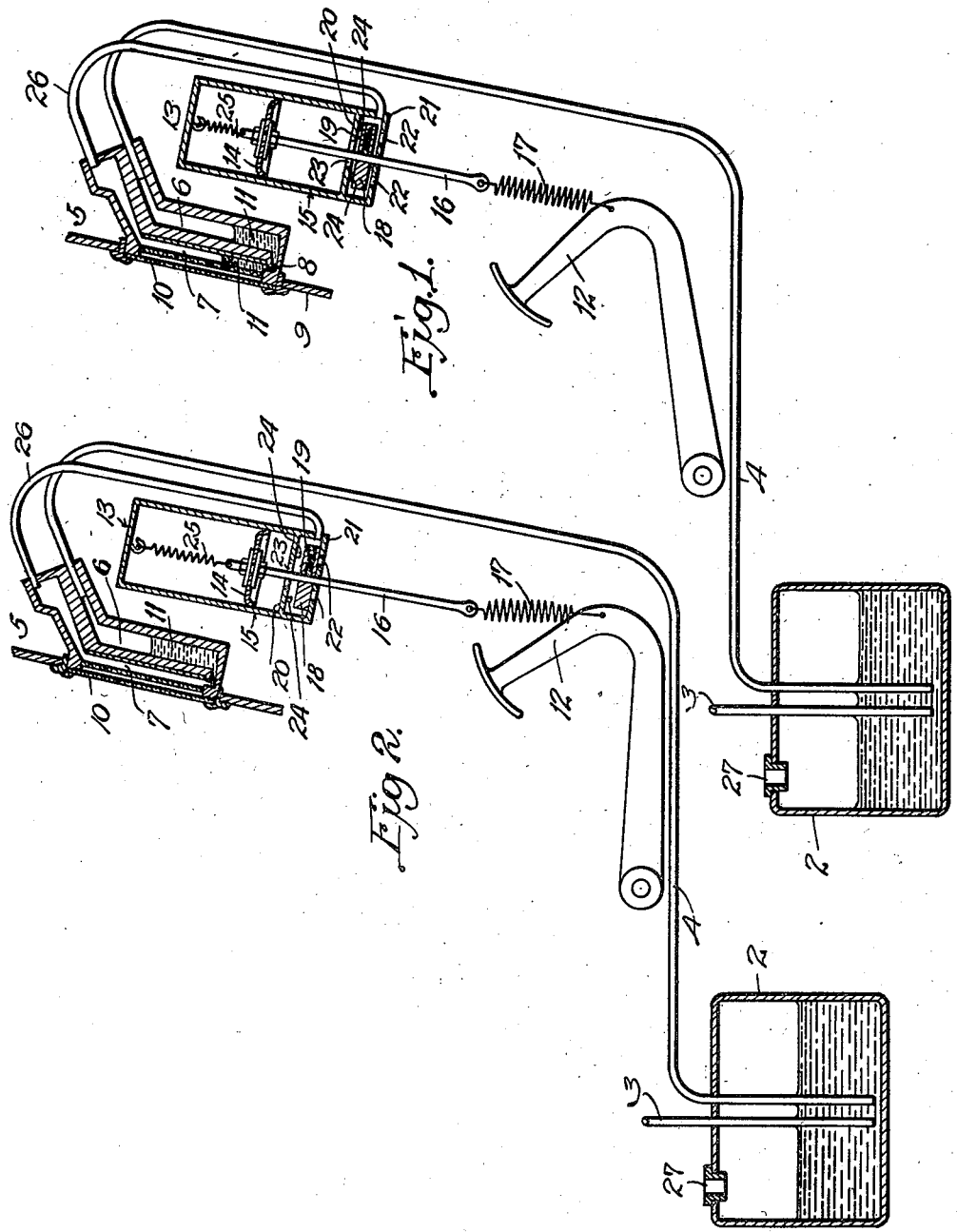

1,698,701

UNITED STATES PATENT OFFICE.

FRANCIS B. SMITHE, OF NEW YORK, N. Y., ASSIGNOR, BY MESNE ASSIGNMENTS, TO F. L. SMITHE MACHINE CO., INC., OF NEW YORK, N. Y., A CORPORATION OF NEW YORK.

LIQUID-LEVEL GAUGE.

Application filed September 25, 1922. Serial No. 590,222.

This invention relates to liquid level gauges and has for its object to provide a device of the class specified, simple in construction, accurate in operation, and having means for rectifying or resetting from time to time the visual indicating means.

To these ends and others which will appear later herein, my improvements comprise features which are illustrated in their preferred embodiment in the drawing accompanying this specification, wherein:—

Figure 1 is a side elevation, partly in section, of my invention as applied, by way of illustration, to gauging the level of the gasoline in the tank of an automobile. Fig. 2 is a similar view showing the parts in different relative positions to better illustrate the operation of the device. The two figures of the drawing are to the same scale and it will be understood that said figures are more or less diagrammatic.

The usual gasoline tank 2, having a filling opening 27, is provided with feed pipe 3 leading therefrom to the motor, not shown. Another pipe 4 leads from near the bottom of the tank to the gauging device, indicated in a general way by 5. Said gauging device is preferably of U-shaped construction and may comprise two approximately vertical chambers 6 and 7 which may be cylindrical. Said chambers are connected at their lower ends, respectively, by a small channel 8. Said gauging device 5 may be conveniently supported on the instrument board 9 and is preferably provided with a scale board 10 adjacent and parallel with chamber 7 and which scale board may carry graduations of known character, not shown. Chamber 6 is the reservoir chamber and is preferably larger in cross section than chamber 7. Said chamber 7 is the reading chamber and is preferably of glass so that the indicating liquid therein may be visible. Said pipe 4, leading from the lower portion of tank 2, communicates with the upper end of large chamber 6. Said chambers 6 and 7 are filled to about midway their height with an indicating liquid 11, such as colored alcohol or any other suitable liquid, and as the liquid in tank 2 rises in tube 4 a portion of the air in said tube is forced into chamber 6, thereby forcing downwardly the level of the liquid in said chamber. A portion of said liquid thereupon passes through channel 8 into chamber 7, thereby raising the level of the liquid in said chamber 7 commensurate with the height of the liquid which rises in the lower end of pipe 4 from the contents of tank 2. This action takes place when and if the upper end of chamber 7 is open to the atmosphere. Such open condition of chamber 7 occurs, in my improved device, under circumstances presently to be described.

Conveniently located adjacent some controlling means, such as the brake lever or preferably the accelerator lever, as 12, of the automobile in which the device is installed, is air pump 13. This pump for purposes of illustration is shown as comprising piston 14 slidably mounted in cylinder 15. Rod 16 of piston 14 is operably connected, preferably by means of spring 17, with said lever 12 so that the pump 13 will have no retarding effect on the lever or pedal 12. Cylinder 15 is closed at its upper end, and may be closed from time to time at its lower end by valve 18. Said valve 18 may be of disc like form, surrounding piston rod 16 and frictionally held thereon by spring 19. Said valve is disposed between transverse walls 20, 21 near the bottom of said cylinder and which walls, with the adjacent wall of the cylinder, form a chamber for said valve. Said chamber is connected with the upper end of smaller chamber 7 of the gauging device by pipe 26. Lower wall 21 has a central hole through which passes piston rod 16 and which rod slidably fits therein. Said wall 21 also has one or more holes 22 therethrough which are adapted to be closed or covered by valve 18 when that valve is in its lowest position, as in Fig. 2. Upper wall 20 has hole 23 through which passes piston rod 16. Said hole 23 is of greater diameter than the diameter of piston rod 16 so that there is always a free passage for air between the interior of cylinder 15 and the valve chamber at the lower end thereof.

Valve 18 is prevented from stopping the passage of air, as described, by some convenient means such as posts 24 projecting downwardly from wall 20 and which posts while permitting a small vertical movement of said valve, prevent the seating of that valve against the under side of wall 20.

The upper end of piston rod 16 is preferably attached to the upper head of cylinder 15 by spring 25, for returning piston 14 to its upper position after having been moved downwardly and released by the movement of lever 12. It will be obvious that spring 17 is much stiffer than spring 25, as said spring 17 must move piston 14 against the resistance of spring 25.

The operation of rectifying or resetting the gauge is as follows: The several elements of the device being in the relative positions of Fig. 1, lever 12 is depressed, Fig. 2, whereby valve 18 is forced downwardly by the frictional engagement of piston rod 16 therewith, and is seated against bottom wall 21 of the cylinder, thereby closing holes 22 therein. The continued downward movement of piston 14 forces the air in said cylinder through opening 23 in wall 20 and thence through pipe 26 into chamber 7 of the gauging device 5, whereby the liquid in said chamber is forced through channel 8 into chamber 6, and as the amount of air discharged by pump 13 is greatly in excess of the capacity of the gauging device 5, said air will bubble through the liquid in chamber 6, into pressure pipe 4 and thence into tank 2 whereby the gasoline or other liquid contents will be forced out of the lower end of pipe 4 into said tank, thereby restoring atmospheric conditions in the pressure pipe 4 to eliminate gauge errors and incidentally clearing said pipe 4 of any obstructions, such as sediment which may have entered therein. Upon the release of lever 12 and its return upwardly toward the position of Fig. 1, the first thing which occurs is the lifting of valve 18 from wall 21, whereby holes 22 are uncovered and air is admitted to the valve chamber and to cylinder 15. The air pressure in chamber 7 is thereby relieved and the liquid in chamber 6 is free to flow back into said chamber 7. Such flow would be more or less checked by the formation of a partial vacuum in pipe 4 except for the fact that the air pressure in pipe 4 is also relieved whereby the liquid in tank 2 promptly mounts in pipe 4, thereby forcing the air in said pipe against the liquid in chamber 6, whereby an added portion of said liquid is forced from chamber 6 into chamber 7, the amount being commensurate with the heights of the level to which the liquid from tank 2 rises in pipe 4.

Thus from time to time, with each operation of lever 12, pump 13 is operated and the gauge is reset automatically, thus avoiding the need of special attention to reset the gauge, the gauge liquid 11 being forced out of the indicating chamber 7 at each actuation of the pump. The observer is thus informed that the apparatus is in working order.

I claim:

1. In an automotive vehicle, the combination of a liquid level gauge including a reservoir chamber, a reading chamber, and a passage between the lower portions of said chambers, said chambers being partially filled with an indicating liquid, a tank for containing the liquid to be gauged, a pipe connecting the upper part of said reservoir chamber with the lower portion of said tank, an air pump operatively connected with the upper part of said reading chamber, a vehicle control member and means responsive to actuation of said member for operating said pump to force air periodically through said gauge and into said pipe.

2. The combination of a liquid level gauge including a reservoir chamber, a reading chamber, and a passage between the lower portions of said chambers, said chambers being partially filled with an indicating liquid, said reading chamber having a transparent wall through which the level of the liquid therein may be observed, a tank for containing the liquid to be gauged, a pipe connecting the upper part of said reservoir chamber with the lower portion of said tank, an air pump, means whereby said pump is operatively connected with the upper part of said reading chamber, said pump comprising a cylinder, a piston, a piston rod, a valve chamber and a valve in said valve chamber, said valve being frictionally connected to said piston rod and adapted for opening said valve chamber and cylinder to the atmosphere at the intake stroke of the pump and for closing said valve chamber and cylinder to shut off communication with the atmosphere at the discharge stroke of the pump, and means for operating said pump for forcing air periodically through said gauge and into said pipe.

3. In an automotive vehicle, the combination of a pressure responsive liquid level gauging device, a tank for containing the liquid to be gauged, a pressure pipe connecting the upper part of the gauging device with the lower portion of said tank, an air pump operatively connected with the upper part of the gauging device, a vehicle controlling member, and a connection between said pump and said member whereby the latter, which is operated from time to time to control the vehicle, also operates said pump to force air through said gauging device into said pressure pipe.

4. In an automotive vehicle having a liquid fuel supply tank, the combination of a pressure responsive gauge for said tank, means for pneumatically transmitting the fuel pressure to said gauge, means for replenishing the air in said transmitting means, a control member actuated in the operation of said vehicle, and means operating the replenishing means in response to actuation of the control member.

5. In an automotive vehicle having an engine and a liquid fuel supply tank therefor, the combination of a pressure responsive gauge for said tank, a pressure conveying conduit extending from said gauge down into the liquid in the tank, pressure maintaining means for said conduit, said means comprising a pump, a controlling lever for said vehicle, and a resilient connection between said pump and said lever whereby said lever when operated to perform its controlling function also operates said pump, and whereby retarding effect of said pump on the lever is avoided.

6. In an automotive vehicle having an engine and a liquid fuel supply tank therefor, the combination of a pressure responsive gauge for said tank, a pressure conveying conduit extending from said gauge down into the liquid in the tank, pressure maintaining means for said conduit, said means comprising a reciprocating pump having a piston, a vehicle control pedal, a resilient connection between the piston and said pedal whereby said pedal when operated operates said piston in one direction, and a spring to return said piston to normal.

7. The combination of a pressure responsive liquid level gauge comprising a reading chamber and a reservoir chamber, said chambers communicating with each other at their lower ends, a gauging liquid in said chambers, a tank containing the liquid to be gauged, said liquid being under atmospheric pressure, a pressure pipe having one end submerged in the liquid in said tank, and its other end connected with the upper end of the reservoir chamber, a pump comprising an air chamber connected with the upper end of the reading chamber, said air chamber being normally open to admit atmospheric pressure to the liquid in the measuring chamber, a valve operable by the effective stroke of said pump to close said air chamber so that the air in the pump may be forced through the liquid in said gauge and into the pressure pipe, said pump being also effective by its return stroke to operate said valve to open the air chamber to restore atmospheric pressure to the gauging liquid in the reading chamber.

8. The combination of a pressure responsive liquid level gauge, a tank containing the liquid to be gauged, gauge resetting means including a pump connected to said gauge, and means to operate said pump, said pump comprising a valve which is normally open, and operable during the initial part of the effective stroke of said pump to close said valve, said valve being opened by said pump during the return of said pump to normal.

9. The combination of a pressure responsive liquid level gauge, a tank containing the liquid to be gauged, gauge resetting means including a pump connected to said gauge, means to operate said pump, said pump being normally open, a valve, means to automatically close said valve on the effective stroke of said pump so that the air in the pump may be forced through said gauge, and means to automatically open said valve on the return stroke of said pump to restore atmospheric pressure to said gauge.

10. In a motor vehicle, the combination with a manually operable control member thereof, of a fuel tank and a pressure responsive gauge on the vehicle, said gauge serving to indicate the level of the fuel in the tank, a conduit having one end open and extending down into the tank to the minimum level of the liquid to be measured and having its other end connected with the gauge, said conduit confining a column of air between the gauge and the liquid in the tank for operating the gauge by the hydrostatic pressure of the fuel in the tank, an air pump, means whereby the pump is connected with said conduit for supplying air thereto, and means connecting the pump with said control member for operating the pump thereby.

11. In a motor vehicle, a member thereof subject to movement at irregular intervals relative to the vehicle body incidental to the normal operation of the vehicle, in combination with a fuel tank and a pressure response gauge on the vehicle, said gauge serving to indicate the level of the fuel in the tank, a conduit having one end open and extending down into the tank to the minimum level of the liquid to be measured and having its other end connected with the gauge, said conduit confining a column of air between the gauge and the liquid in the tank for operating the gauge by the hydrostatic pressure of the fuel in the tank, an air pump, means whereby the pump is connected with said conduit for supplying air thereto, and means whereby said pump is so interconnected with said vehicle body and the member movable relative thereto that the pump will be operated upon the relative movement of said vehicle parts.

In witness whereof, I hereby affix my signature this 20th day of September, 1922.

FRANCIS B. SMITHE.